United States Patent
Frazier

(10) Patent No.: US 7,921,808 B2
(45) Date of Patent: Apr. 12, 2011

(54) BIRD FEEDER

(76) Inventor: Lester E. Frazier, Port Lavaca, TX (US)

( * ) Notice: Subject to any disclaimer, the term of this patent is extended or adjusted under 35 U.S.C. 154(b) by 107 days.

(21) Appl. No.: 12/386,119

(22) Filed: Apr. 14, 2009

(65) Prior Publication Data

US 2010/0258054 A1    Oct. 14, 2010

Related U.S. Application Data

(60) Provisional application No. 61/125,246, filed on Apr. 24, 2008.

(51) Int. Cl.
  *A01K 39/01* (2006.01)
(52) U.S. Cl. ...................................... 119/52.2; 119/469
(58) Field of Classification Search ............... 119/51.01, 119/51.03, 52.2, 52.3, 57.8, 57.9, 61.2, 72, 119/72.5, 74, 77, 467, 469, 479
See application file for complete search history.

(56) References Cited

U.S. PATENT DOCUMENTS

| | | | |
|---|---|---|---|
| 1,450,175 A | 4/1923 | Honsinger | |
| 2,521,259 A * | 9/1950 | Shea | 119/77 |
| 2,591,459 A | 4/1952 | Meany | |
| 4,732,112 A * | 3/1988 | Fenner et al. | 119/52.2 |
| 5,095,847 A | 3/1992 | Coffer | |
| 5,479,879 A | 1/1996 | Biek | |
| 5,549,227 A * | 8/1996 | Klotz | 222/461 |
| 5,634,429 A | 6/1997 | Loomis | |
| 5,655,477 A * | 8/1997 | Hoffman et al. | 119/52.2 |
| 5,921,296 A * | 7/1999 | Porter et al. | 141/340 |
| 6,405,673 B1 | 6/2002 | Allender | |
| 7,654,225 B2 * | 2/2010 | Madsen et al. | 119/52.3 |
| 2005/0103278 A1 * | 5/2005 | Espinda | 119/467 |

* cited by examiner

*Primary Examiner* — Rob Swiatek
*Assistant Examiner* — Ebony Evans
(74) *Attorney, Agent, or Firm* — G. Turner Moller

(57) ABSTRACT

A bird feeder comprises a feed container, a connector having an open passage therethrough, a feeding tray, a funnel and a collection container. The feeding tray includes a sleeve into which the connector extends to provide a self refilling feed mound from which birds eat. Discarded seeds and seed hulls fall into the funnel and into the collection container. The feeding tray includes a disk located below an upper edge of the funnel to maximize collection of seed hulls and discarded seeds. In some embodiments, the feeding tray is pivotally attached to the connector.

8 Claims, 1 Drawing Sheet

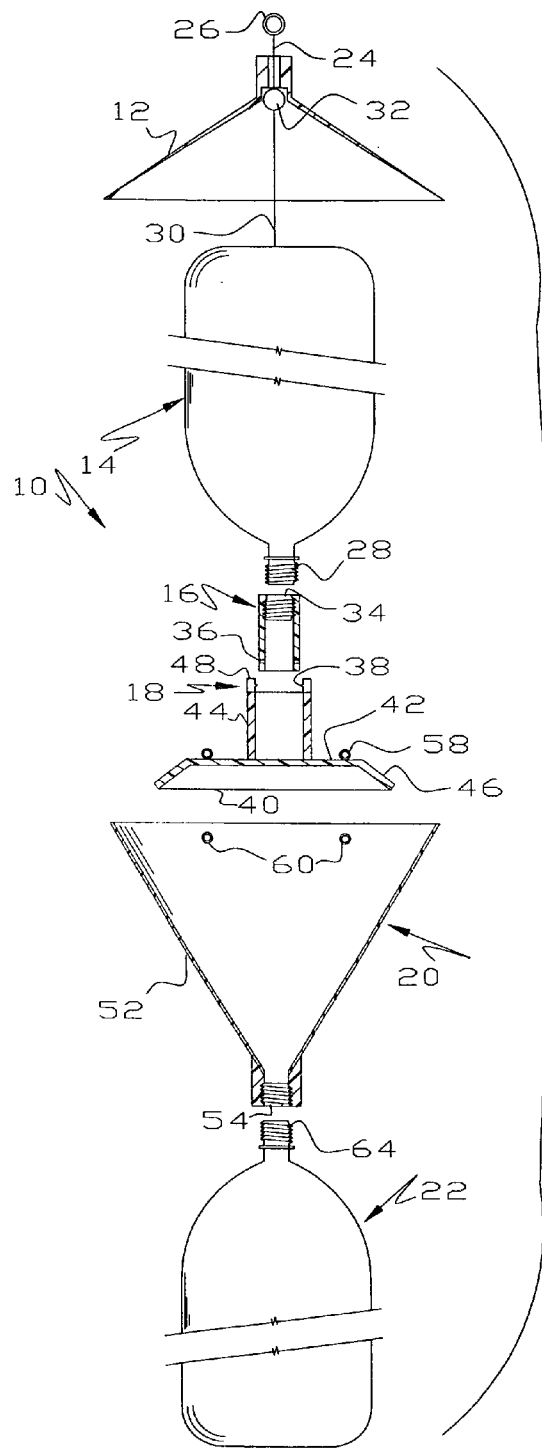
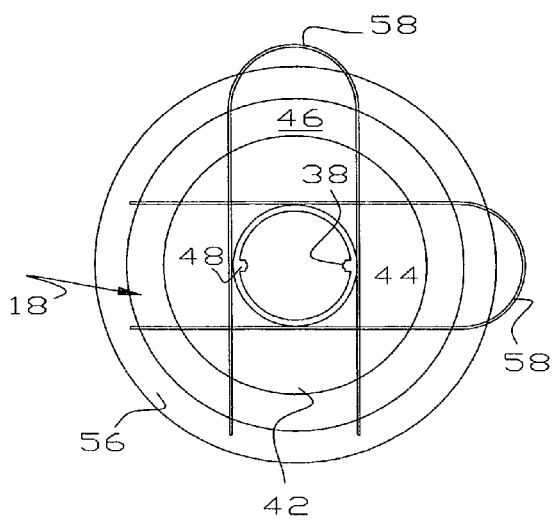
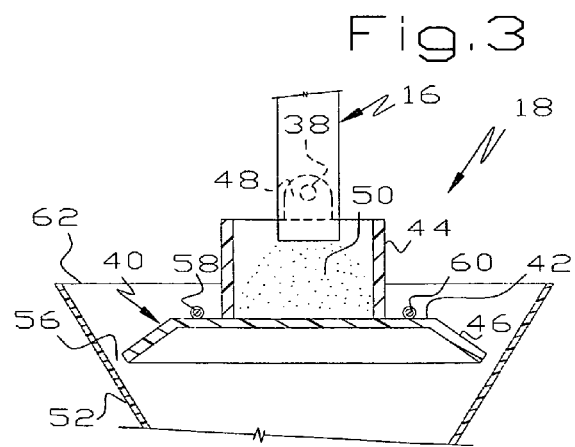

US 7,921,808 B2

BIRD FEEDER

This application is based on Provisional Patent Application 61/125,246 filed Apr. 24, 2008, on which priority is claimed.

This device relates to a bird feeder and more particularly to a bird feeder capable of accumulating uneaten discarded seeds and discarded seed parts.

BACKGROUND OF THE INVENTION

It is no surprise to say that birds are messy feeders. Conventional bird feeders produce uneaten seeds below the feeder along with an accumulation of seed hulls. Some birds willingly eat from the feeder but will not scratch through mounds of seed hulls under the feeder looking for uneaten seeds. Even if the birds sift through the seed hulls looking for uneaten seeds, the scattered seed hulls create an unsightly and often unsanitary condition.

In addition, the accumulation of uneaten seeds creates an attraction for unwanted creatures such as squirrels, raccoons and other varmints. It is accordingly not surprising that attempts have been made in the prior art to provide bird feeders which accumulate uneaten seeds and discarded seed hulls such as shown in U.S. Pat. Nos. 1,450,175; 2,591,459; 5,095,847 and 6,405,673. Other disclosures of interest are found in U.S. Pat. Nos. 4,732,112; 5,479,879; 5,634,429 and 5,655,477.

SUMMARY OF THE INVENTION

A bird feeder is equipped with a seed container positioned to deliver seeds to an eating area. When birds feed at the eating area and scatter uneaten seeds or seed hulls, they fall through a funnel shaped device into a collection container. The collection container accordingly collects uneaten seeds and discarded seed parts, which are mainly seed hulls.

An interesting feature of the disclosed bird feeder is that the seed receptacle and the collection receptacle are standard bottles, such as one to three liter soft drink bottles, milk jugs or the like. Thus, the operating parts of this device may be sold separately in an efficient, cost effective manner with the consumer providing the bottles.

It is an object of this invention to provide an improved bird feeder having the capability of accumulating uneaten seeds and/or discarded seed hulls.

A further object of this invention is to provide a bird feeder in which several of the components are recycled bottles and the remaining components are inexpensive and which may be sold separately.

Another object of this invention is to provide a bird feeder in which the debris collecting container is matched with the feed container so there is enough capacity to accommodate all of the uneaten feed and feed parts that would otherwise accumulate.

These and other objects and advantages of this invention will become more apparent as this description proceeds, reference being made to the accompanying drawings and appended claims.

BRIEF DESCRIPTION OF THE DRAWINGS

FIG. 1 is an exploded view, partly in section, of one embodiment of a bird feeder;

FIG. 2 is a top view of part of a funnel shaped collector for directing discarded uneaten seeds and seed hulls to a collection container; and FIG. 3 is an enlarged partial view of the top of the funnel shaped collector, illustrating a seed pile and the path of discarded seed parts into a funnel, FIG. 3 being 90° rotated relative to FIG. 1.

DETAILED DESCRIPTION OF THE INVENTION

Referring to FIGS. 1-3, a bird feeder 10 comprises, as major components, a squirrel cover or rain shed 12, a seed container or receptacle 14, a connector 16, a feeding tray 18, a collector 20 and a collection container or receptacle 22. The bird feeder 10 can be suspended from a tree or other suitable support by a cord 24 connecting an eye 26 attached to the squirrel cover 12.

The seed receptacle 14 is preferably a standard container, such as a one, two or three liter soft drink bottle, milk jug or the like, obtainable by any consumer and having a threaded mouth or neck 28. In some embodiments, the neck 28 has male threads on the outside of the neck 28. A cord 30 suspends the container 14 from an abutment 32 attached at one end to the eye 26 and attached at the other end to the container 14 in any suitable manner, as by gluing the cord 30 to the bottom of the container 14.

The connector 16 comprises a pipe nipple having female threads 34 for receiving the threaded neck 28 of the bottle 14 and some means for attachment to the feeding tray 18. In some embodiments, this connection is a pair of aligned openings or recesses 36 for receiving pins 38 provided by the feeding tray 18. In these embodiments, it will be seen that the feeding tray 18 is pivotally or loosely joined to the connector 16. It will be seen that the junction between the connector 16 and the feeding tray 18 may be rigid, such as by providing mating threads between the connector 16 and the feeding tray 18.

The feeding tray 18 comprises a disk or plate 40 having a central flat section 42 supporting an open top cup or sleeve 44 and a downwardly inclined peripheral section 46 for purposes more fully apparent hereinafter. In some embodiments, the sleeve 44 includes an uninterrupted side wall while, in other embodiments, the side wall of the sleeve includes openings therethrough for the presentation of feed on the disk 40. The sleeve 44 includes a pair of upstanding ears 48 providing the pins 38 loosely received in the openings 36. The bottom of the connector 16 is spaced above the bottom of the cup 44 so seeds gravitationally accumulate in a mound 50 and stop flow through the connector 16 until birds remove feed from the cup 44. The bird feeder 10 is accordingly of the self dispensing or self refilling type.

The collector 20 comprises a funnel 52 having a threaded lower end 54 for coupling to the collection receptacle 22. In some embodiments, the funnel 52 is circular in cross-section. The funnel 52 cooperates with the feeding tray 18 in several respects. The disk or plate 40 partly obstructs the large open end of the funnel 52 and conveniently provides an annular gap 56 between the disk 40 and the funnel 52 to allow discarded seeds or discarded seed parts to fall into the funnel 52 and thus into the collection receptacle 22. The outer section 46 of the disk 40 is preferably downwardly inclined to facilitate gravitational movement of discarded seeds and seed hulls toward the annular gap 56.

The funnel 52 and collection container 22 are supported from the disk 40 in any suitable manner. In some embodiments, U-shaped retaining wires 58 extend through openings 60 in the funnel wall near the large open end. It will be seen that the disk 40 is accordingly below the wires 46 and below a top edge 62 of the funnel 52 so the disk 40 is captivated inside the funnel 52 near its large open end. This maximizes the volume of discarded seeds and hulls falling into the collection container 22 as opposed to the volume of seed and hulls collecting on the ground under the feeder 10.

The feeding tray 18 accordingly provides a structural support for the funnel 52 and collection container 22, provides a platform which supports feeding birds and maximizes the volume of collected seeds and hulls.

The collection receptacle 22 is also preferably a conventional bottle, such as a one, two or three liter soft drink bottle or milk jug, that is easily obtained by consumers. In some embodiments, the receptacle 22 includes an exteriorly threaded mouth 64 which is attachable to the threaded lower end 54 of the funnel 52. In preferred embodiments, the collection receptacle 22 is as large or larger than the feed container 14 because the volume of discarded seeds and seed hulls is about the same volume as the feed from which they come.

Installation and use of the bird feeder 10 should now be apparent. The feeding tray 18 is inserted into the large open end of the funnel 52 and the wires 58 passed through the openings 60 to captivate the disk 40 slightly below the upper edge of the funnel 62. The connector 16 is snapped onto the ears 48. The bottle 22 is threaded onto the funnel 52. The bottle 14, full of seed, is threaded onto the connector 16. The bottle 14 is attached to the cord 30 and the bird feeder 10 suspended from a suitable support, such as a tree, post or the like.

Feed flows out of the connector 16 onto the disk 40 and is constrained by the cup 44 to create a seed pile or mound 50 shown in FIG. 3. It will be apparent that birds stand on the disk 40 or on the upper edge 62 of the funnel 52 and eat from the seed pile 50. As birds eat seeds from the pile 50, more seeds will gravitate down through the connector 16 to replenish the mound 50. Any discarded seed or seed hulls generated by the feeding birds are either tossed over the side of the funnel 52 to collect on the ground below or drop onto the disk 40 and gravitate through the gap 56 into the funnel 52. Because of the size of the large open end of the funnel 52, it will be apparent that the vast bulk of discarded seeds or seed hulls pass through the funnel 52 rather than end up on the ground below the bird feeder 10.

When the seed bottle 14 is emptied, it is time to service the bird feeder 10. If the collection receptacle 22 is largely uneaten seeds, the contents may be passed again through the bird feeder simply by attaching the collection bottle 22 to the connector 16, i.e. swap the bottle 14 for the bottle 22. More likely, the collection receptacle 22 contains mostly seed hulls. They may either be discarded or separated from uneaten seeds in any suitable manner.

Although this device has been disclosed and described in its preferred forms with a certain degree of particularity, it is understood that the present disclosure of the preferred forms is only by way of example and that numerous changes in the types of fatty acids and types of abrasives as well as the percentages thereof may be resorted to without departing from the spirit and scope of the invention as hereinafter claimed.

I claim:

1. A bird feeder comprising
a feed container comprising a first plastic bottle having a lowermost exteriorly threaded neck and means for suspending the first bottle from a support,
an open conduit threaded to the neck of the first bottle for transmitting feed therethrough,
a feeding tray including
an open top sleeve, connected to the conduit, into which the conduit extends to produce a mound of feed at a base of the sleeve which is continuously replenished by gravity from the feed container, and
a support, around the sleeve, on which birds can stand during feeding, comprising a central section fixed to the open top sleeve and a peripheral section downwardly inclined from the central section and having an outer lip,
a funnel having an input end larger than the peripheral section for receiving seed hulls and uneaten bird feed falling from birds feeding out of the sleeve and a small output end,
the input end of the funnel being vertically above the outer lip of the peripheral section,
the funnel being supported from the feeding tray,
the output end of the funnel including a female threaded neck, and
a second plastic bottle having an uppermost exteriorly threaded neck received in the output end of the funnel for collecting seed hulls and uneaten seeds from the funnel, the second bottle being at least as large as the first bottle.

2. The bird feeder of claim 1 wherein the open conduit and feeding tray are pivotally connected.

3. A bird feeder comprising
a feed container and means for suspending the feed container from a first support,
an open conduit secured to the container for transmitting feed therethrough,
a feeding tray comprising an open top sleeve, connected to the conduit, into which the conduit extends to produce a mound of feed at a base of the sleeve which is continuously replenished by gravity from the feed container,
a second support around the sleeve on which birds can stand during feeding,
a funnel, supported from the feeding tray, having an input end larger than the second support for receiving uneaten bird feed and seed hulls falling from the feeding sleeve and a small threaded output end, and
a collection container threadably secured to the output end of the funnel.

4. The bird feeder of claim 3 wherein the second support comprises a peripheral section and the input end of the funnel is vertically above an outer lip of the peripheral section.

5. The bird feeder of claim 3 wherein the output end of the funnel includes a female threaded neck and the collection container includes an exteriorly threaded neck receiving the output end of the funnel.

6. The bird feeder of claim 3 wherein the open conduit and feeding tray are pivotally connected.

7. The bird feeder of claim 3 wherein the feed container and the open conduit are threadably connected.

8. The bird feeder of claim 3 wherein the support comprises a disk, around the sleeve on which birds can stand during feeding, including a central section fixed to the sleeve and a peripheral section downwardly inclined from the central section and having an outer lip smaller than an inlet end of the funnel.

* * * * *